United States Patent [19]

Gewitz et al.

[11] 4,399,333

[45] Aug. 16, 1983

[54] TELEPHONE FAULT DETECTION SYSTEM

[75] Inventors: Steven Gewitz, Bayside, N.Y.; Raymond Z. A. Elia, Tenafly, N.J.

[73] Assignee: Teltec Inc., Tenafly, N.J.

[21] Appl. No.: 288,571

[22] Filed: Jul. 30, 1981

[51] Int. Cl.³ .............................................. H04B 3/46
[52] U.S. Cl. ...................... 179/175.3 F; 179/175.2 C
[58] Field of Search ................... 179/175.3 F, 175.3 R, 179/175.2 C, 1 MN, 2 C, 2 DP, 170 F, 18 AH

[56] References Cited

U.S. PATENT DOCUMENTS 3,636,280  1/1972  Wetzel .......................... 179/175.3 R Primary Examiner—Stafford D. Schreyer
Attorney, Agent, or Firm—Blum, Kaplan, Friedman, Silberman & Beran

[57] ABSTRACT

A telephone fault detection system particularly suitable for use with a home telephone system is provided. The system includes a switching circuit coupled to a telephone company trunk line and to telephone customer equipment. In particular, the telephone customer equipment includes at least a monitoring device, such as a telephone handset, and at least one further telephone handset. When the switching circuit is in a first normally operative mode, the monitoring device and the telephone handset are coupled to the trunk line so that the monitoring circuit can provide indication of a fault condition on either the telephone company trunk line side or the internal telephone system side of the switching circuit. When the switching circuit is disposed in a second test mode, the additional telephone handsets are decoupled from the telephone trunk line and the monitoring device detects the location of the fault condition in either the telephone trunk line or the internal telephone system.

12 Claims, 1 Drawing Figure

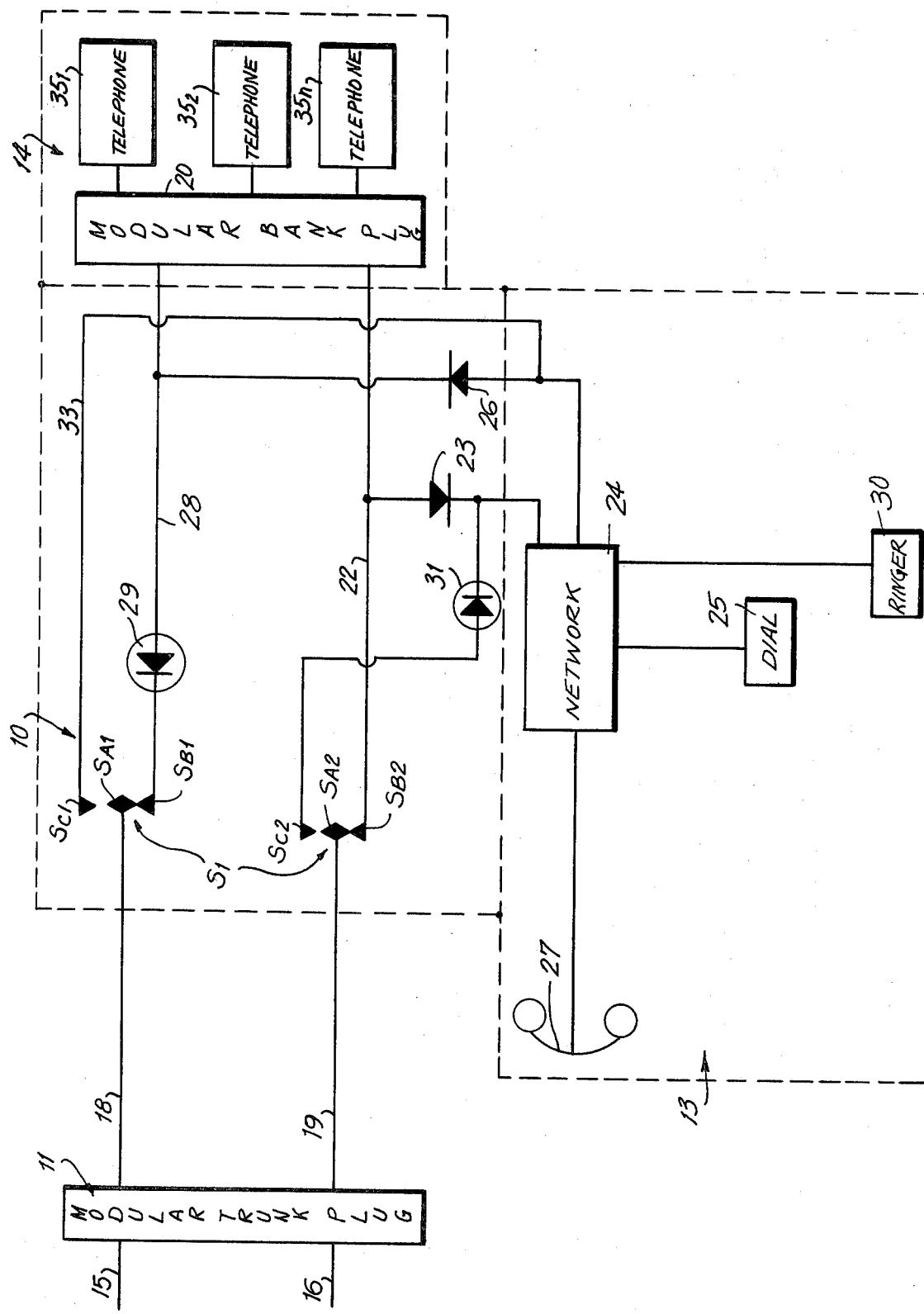

TELEPHONE FAULT DETECTION SYSTEM

BACKGROUND OF THE INVENTION

This invention is directed to a telephone fault detection system for in-line installation with telephone company trunk lines and, in particular, to a fault detection system that provides an indication of the occurrence of a fault condition in a telephone system and whether the fault condition is with the telephone company or in a customer's telephone equipment.

Heretofore, fault isolation systems for determining whether a fault condition occurs in a professional telephone system have been provided in order to deal with problems that are normally associated with the installation of professional communication equipment, such as private branch exchanges (PBX's) and key systems (KSU's). Such equipment is either leased from a local telephone company or purchased from a private company and, in either instance, is connected to a local telephone company's dial central office over leased telephone trunks.

When a fault condition occurs within a telephone system that includes a leased telephone trunk and customer owned professional equipment, the fault condition is not necessarily in the telephone company trunk line. Although the telephone company will test and repair its own leased equipment, it will not accept the responsibility for customer owned equipment. When the telephone company is required to make a service call and ultimately determines that the trouble lies within the customer owned equipment, the customer is then charged for a customer call thereby providing a considerable disincentive to the ownership of customer owned equipment. This disincentive has further discouraged the purchase of non-professional type private telephone equipment for use in homes, apartments and small businesses.

A system for facilitating a determination whether a fault condition lies with the customer owned commercial equipment or with the telephone company equipment is disclosed in U.S. patent application Ser. No. 169,715, filed on July 17, 1980 now abandoned. The system disclosed in application No. 169,715, however, is limited to the use of an extrinsic monitoring device that has no utility in the customer owned telephone system other than to detect a fault condition and, for this reason, is neither practical nor satisfactory for a non-professional private telephone system of the type to be found in a home, apartment or small business facility. Furthermore, the fault isolation device described in applicants' U.S. patent application Ser. No. 169,715 does not provide a visual fault indication. Accordingly, a telephone fault detection system for in-line installation between a telephone company trunk line and a privately owned or leased telephone system that is capable of providing a visual indication of a fault condition when the system is in a normal operating mode and is further capable of discerning if the problem is located in the internal telephone equipment or with the telephone company is desired.

SUMMARY OF THE INVENTION

Generally speaking, in accordance with the instant invention, a telephone fault detection system that can provide an indication of a fault condition on either the telephone company trunk line side or on the internal telephone system side is provided. The telephone fault detection system is for in-line installation with at least one trunk line and an internal telephone system. The internal telephone system includes a first monitoring device and at least one telephone. An in-line switching circuit is coupled between the monitoring device and the trunk line and is disposed in a first normally operative mode for coupling the trunk line to the monitoring device and to each telephone. The in-line switching circuit is adapted to be disposed into a second test mode for maintaining the monitoring device, coupled to the trunk line, and for the decoupling trunk line to each of the telephones, the monitoring device being adapted to provide an indication of fault detection on the trunk line side of the in-line switching circuit when the switching circuit is disposed in the second test mode.

Accordingly, it is an object of the instant invention to provide an improved telephone fault detection system.

A further object of the instant invention is to provide an improved telephone fault detection system that detects both telephone company line fault conditions and internal telephone system fault conditions.

A still further object of the instant invention is to provide a telephone fault detection system that provides a visual indication of fault conditions.

Still a further object of the instant invention is to provide a customer telephone fault detection system that provides audible and visual indications of fault conditions.

Still a further object of the instant invention is to provide a telephone fault detection system that avoids the necessity of telephone company intervention to monitor fault conditions that occur in the internal telephone system.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawing, in which:

The drawing is a circuit diagram of a telephone fault detection system constructed in accordance with a preferred embodiment of the instant invention.

DETAILED DESCRIPTION OF THE PREFERRED EMBODIMENTS

Referring to the drawing, a telephone fault detection monitoring circuit, generally indicated as 10, is coupled between an internal telephone system comprised of a telephone bank, generally indicated as 14, a monitoring telephone handset 13 and a modular trunk plug 11 of a telephone trunk line that is installed by the telephone company. As is explained in detail below, in an exemplary embodiment of the instant invention, fault detection circuit 10 is installed within the monitoring handset 13 so that a modular plug 20 for the telephone bank of the remaining telephones in the internal telephone system are all physically coupled through the integrally formed monitoring handset and monitoring circuit to the modular trunk plug 11.

By way of reference, a telephone company will couple a red ring wire 15 and green tip wire 16 to a dwelling or building through a modular trunk plug 11. For example, if a home owner requests a telephone installation from a telephone company and further advises the telephone company that it will not use its equipment, the telephone company will intall a modular plug 11 having a conventional ring contact 18 ($-48$ V) and a tip contact 19 (grounded) for connection to a conventional handset or to a modular bank plug 20 for connecting several telephones $35_1, 35_2 \ldots 35_n$ to the modular trunk plug 11.

As aforenoted, in an exemplary embodiment of the instant invention, the monitoring circuit 10 is incorporated into the same housing as the monitoring handset 13 to provide an audio-visual indication of a fault condition and, additionally, the location thereof. Monitoring circuit 10 includes a double pole, double throw switch $S_1$. Switch $S_1$ includes a pair of moveable contacts $S_{A1}$ and $S_{A2}$ to which ring lead 18 and tip lead 19 are respectively coupled.

Fixed contact $SB_2$ is coupled through lead 22 and diode 23 to telephone network 24 of the monitoring handset 13. The telephone network 24 of the monitoring handset 13 includes a conventional dial 25 (rotary or touchtone), a ringer 30 and a receiver 27. Network 24 is coupled through diode 26, lead 28, and red LED 29 to fixed contact $S_{B1}$.

A second fixed contact $S_{C2}$ of switch $S_1$ is coupled through green LED 31 to network 24. Network 24 is, in turn, coupled through lead 25 and lead 33 to fixed contact $S_{C1}$ of switch $S_1$. Accordingly, fixed contacts $S_{C2}$ and $S_{C1}$ are momentary contacts and are coupled to moveable contacts $S_{A1}$ and $S_{A2}$ only if the switch $S_1$ is held in a pressed position.

Fixed contacts $S_{B1}$ and $S_{B2}$ are also respectively coupled through leads 28 and 22 to modular bank plug 14, which plug represents a modular bus for coupling additional telephone handsets $35_1, 35_2 \ldots 35_n$ for use in multiple rooms in a dwelling or office in addition to monitoring handset 13. Accordingly, modular bank plug 20 couples the additional handsets $35_1, 35_2 \ldots 35_m$ to the telephone company trunk line when switch $S_1$ is disposed in its normally operative position.

The fault detection system of the instant invention could be utilized with a customer owned internal telephone system in the following manner. A telephone handset, having a housing including monitoring handset 13 and fault detection monitoring circuit 10, would be coupled to a modular plug 11 installed by the telephone company. In turn, all of the additional telephone handsets in the building would be coupled to the modular bank plug 20. When switch $S_1$ is disposed in a first normal condition, the tip terminal of the modular trunk plug 11 is coupled through fixed contact $S_{B2}$ of switch $S_1$ and through forward biased diode 23 to the handset network 24 which is, in turn, coupled through forward biased diode 26, red LED 29 and fixed contact $S_{B1}$ to the ring terminal of the modular trunk plug 11. Thus, red LED 29 is placed in series with the ring side of the modular trunk plug and is forward biased when the telephone system is in an off-hook condition. Additionally, in this normal condition, the modular bank plug couples all of the additional telephone handsets $35_1, 35_2 \ldots 35_n$ through leads 22 and 28 to the tip and ring side of the modular trunk plug, respectively.

When switch $S_1$ is in a first normally operative condition, red LED 29 will flutter when an incoming call actuates the ringer in the respective telephone handsets. Additionally, red LED 29 will remain lit when any one of the additional telephone handsets $35_1$ through $35_n$ or monitoring handset 13 is being used for a telephone call or is off the hook. Thus, in a first normally operative mode, the red LED 29 will provide a visual indication when one or more telephone handsets are off the hook thereby detecting one type of fault condition. Similarly, if there is a fault condition in the trunk line, the red LED may possibly light thereby providing a visual indication of a further problem in the system. Similarly, if the red LED 29 does not light when the headset is removed from any of the telephone instruments, an indication is provided of a fault condition in either the trunk line, the internal telephone system or that the tip and ring polarity of the modular trunk plug has been reversed.

Based upon any one of the above noted fault conditions being detected, an individual need only manually operate switch $S_1$ to thereby couple contacts $S_{C1}$ and $S_{C2}$ to the ring and tip sides of the modular trunk plug, respectively. The switch $S_1$ should be held in the second test position for at least ten seconds in order to permit the central telephone office to return the trunk line to an on-hook condition.

By disposing switch $S_1$ in a second test mode position, the modular bank plug 20 and each of the additional telephone handsets $35_1$ through $35_n$ are decoupled from the ring and tip sides of the modular trunk plug 11, thereby electrically isolating the modular bank plug 20 from the modular trunk plug 11. Also, in the test mode, the tip side of modular trunk plug 11 is coupled through fixed contact $S_{C2}$ and green LED 31 to network 24. Network 24 is, in turn, coupled through lead 33 and fixed contact $S_{C1}$ to the ring side of the modular trunk plug 11. In the test mode, diodes 23 and 26 are reverse biased thereby isolating the tip side 22 of the modular bank plug from network 24 and further isolating the ring side 28 of the modular bank plug 14 from the network 24. Finally, in a test mode configuration, green LED 31 is forward biased thereby providing a visual indication when the headset 27 of the monitoring handset 13 is in an off-hook condition.

Accordingly, when switch $S_1$ is disposed into a test mode condition, with the exception of monitoring handset 13, all of the remaining telephone handsets in the internal telephone system are isolated from the trunk line. Removal of the receiver 27 from the handset 13, causes green LED 31 to be lit, thereby visually indicating a fault condition in the internal telephone system and, in particular, in one of the handsets $35_1$ through $35_n$ or in the connections of same to the fault detection monitoring circuit 10 and monitoring handset 13. Similarly, having isolated the internal telephone system from the modular trunk line, if green LED 31 does not become lit when monitoring handset 13 is placed in an off-hook condition, the fault condition can then be identified as being localized on the trunk side of switch $S_1$. If the individual observes a visual indication by green LED 31 or, alternatively, an audio indication by hearing a dial tone in the receiver 27, he may further test the telephone system by actuating dial 25 to test whether it is possible by dialing to break a dial tone. If the customer can hear a dial tone and can then break the dial tone the trunk line is determined to be in normally operative condition. However, if the customer cannot obtain a dial tone, this will become apparent either by the failure of green LED 31 to light, or if the individual cannot break the dial tone using the dialer, an indication will be provided that the fault condition lies with the telephone company. Based upon the visual and audio information observed by the individual when switch S₁ is disposed in a test mode, location of the fault condition can be ascertained and the telephone company repairman called if the fault condition is in the telephone company side or a private repairman can be called if the fault condition is on the internal telephone system side of the fault detection circuit.

Accordingly, the instant invention is characterized by a telephone fault detection system that is capable of providing a fault condition indication when the system is in a normal operating mode and is further capable of decoupling a substantial portion of the internal system to thereby determine if the fault condition occurs on the telephone company side of the trunk line. In addition to a telephone handset being utilized for providing an audio indication, an LED or other light indicating means can be utilized to provide a visual indication as to the presence or absence of a fault condition. Finally, the instant invention is particularly characterized by a telephone fault detection system that permits private telephone equipment to be readily coupled in-line to a telephone company's trunk line installation and further assures that the telephone company repairmen will only be called when a fault condition occurs on the telephone company's side of the fault isolation circuit.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A telephone fault detection system for in-line installation with at least one trunk line comprising internal telephone means having first monitoring means and telephone means, switching means coupled in-line between the monitoring means and said trunk line, said switching means being disposed in a first normally operative mode for coupling said trunk line to said monitoring means and said telephone means, said switching means being adapted to be disposed into a second test mode for maintaining said monitoring means coupled to said trunk line and for decoupling said trunk line from said telephone means, said monitoring means being adapted to provide an indication of fault detection on the trunk line side of said switching means when said switching means is disposed in said second test mode, said monitoring means being adapted to provide an indication of a fault condition when said in-line switching means is disposed in said first normally operative mode, said monitoring means including a telephone monitoring handset and said telephone means including at least one additional telephone handset.

2. A telephone fault detection system, as claimed in claim 1, wherein said monitoring means includes visual indication means for providing a visual indication of a fault condition when said switching means is in a first normally operative mode.

3. A telephone fault detection system, as claimed in claim 2, and including a second visual indication means that is adapted to provide a visual indication of one of the presence and absence of a fault condition on the trunk line side of said switching means when said switching means is disposed in said second test mode.

4. A telephone fault detection system, as claimed in claim 1, wherein said monitoring means includes a visual indication means, said visual indication means being disposed intermediate said telephone monitoring handset and said switching means to thereby provide a visual indication when one of said telephone monitoring handset and each of said additional telephone handsets is in an off-hook condition when said switching means is in a first normally operative mode.

5. A telephone fault detection system, as claimed in claim 4, and including second visual indication means disposed intermediate said telephone monitoring handset and said switching means, said visual indication means being adapted to provide a visual indication representative of the location of a fault condition on the telephone company's side of said switching means when said switching means is disposed in a second test mode.

6. A telephone fault detection system, as claimed in claim 1, 4 or 5, and including isolation means coupled intermediate said telephone monitoring handset and each additional telephone handset, said isolation means effecting electrical isolation and decoupling of each additional telephone handset from said trunk line and from said telephone monitoring handset when said switching means is disposed in said second test mode.

7. A telephone fault detection system, as claimed in claim 4, wherein each of said additional telephone handsets are coupled through said visual indication means to said trunk line when said switching means is disposed in a first normally operative condition, said visual indication means being adapted to provide a visual indication when any one of said additional telephone handsets is in an off-hook condition.

8. A telephone fault detection system, as claimed in claims 1 or 4, wherein said switching means and said telephone monitoring handset are integrally disposed with respect to each other in the same housing.

9. A telephone fault detection system, as claimed in claims 1 or 4, wherein said monitoring means provides an audio visual indication of a fault condition when said in-line switching means is disposed in said first normally operative mode and further provides an audio visual indication of the location of a fault condition when said switching means is disposed in a second test mode.

10. A telephone fault detection system, as claimed in claim 1, wherein said switching means includes a double pole, double throw switch coupled to said telephone trunk line, said switch having a first fixed contact pair connected to said monitoring means and to said telephone means, said second fixed contact pair being connected to said monitoring means.

11. A telephone fault detection system, as claimed in claims 1 or 4, wherein said telephone monitoring handset means includes telephone dialing means for providing signals on said respective trunk lines for dialing.

12. A telephone fault detection system, as claimed in claim 11, wherein said monitoring means further includes a network for coupling said handset means and said dialing means to said switching means.

* * * * *